(12) United States Patent
Jakeman et al.

(10) Patent No.: US 7,986,062 B2
(45) Date of Patent: Jul. 26, 2011

(54) ELECTRICAL ENERGY CONVERTER

(75) Inventors: Nigel Jakeman, Stamford (GB); Damyn James Musgrave, Cottenham (GB)

(73) Assignee: Gendrive Limited, Cambridge (GB)

( * ) Notice: Subject to any disclaimer, the term of this patent is extended or adjusted under 35 U.S.C. 154(b) by 196 days.

(21) Appl. No.: 12/448,333

(22) PCT Filed: Dec. 14, 2007

(86) PCT No.: PCT/GB2007/004795
§ 371 (c)(1),
(2), (4) Date: Jun. 16, 2009

(87) PCT Pub. No.: WO2008/074996
PCT Pub. Date: Jun. 26, 2008

(65) Prior Publication Data
US 2010/0091529 A1    Apr. 15, 2010

(30) Foreign Application Priority Data
Dec. 16, 2006   (GB) .................................. 0625121.9

(51) Int. Cl.
*G05F 3/06* (2006.01)
(52) U.S. Cl. ....................................................... 307/151
(58) Field of Classification Search ................... 307/151
See application file for complete search history.

(56) References Cited

U.S. PATENT DOCUMENTS

| | | | |
|---|---|---|---|
| 5,109,185 A | 4/1992 | Ball | |
| 5,225,712 A | 7/1993 | Erdman | |
| 5,319,533 A | 6/1994 | Reynolds | |
| 2004/0125618 A1 | 7/2004 | De Rooij | |

FOREIGN PATENT DOCUMENTS

| | | |
|---|---|---|
| DE | 4344709 A1 | 6/1995 |
| WO | WO-95-16231 A | 6/1995 |
| WO | WO-98-12798 A1 | 3/1998 |
| WO | WO-01-86797 A1 | 5/2001 |
| WO | WO-2006-121425 A | 11/2006 |

*Primary Examiner* — Robert L. DeBeradinis
(74) *Attorney, Agent, or Firm* — Dilworth Paxson LLP

(57) ABSTRACT

An electrical energy converter (100) arranged to be connected to at least one source of electrical energy (114, 116) and to condition the energy generated by that source to be suitable for feeding to a network (110) to which the converter (100) may be connected, the converter (100) comprising an input conversion stage (104) having at least three input terminals (P1-6) and a controller, the controller (112) being arranged to configure each of the terminals (p1-6) to accept any one of the following input types:
  1. a phase of a polyphase supply;
  2. one side of a single phase supply;
  3. one side of a DC supply; and
  4. no-input.

20 Claims, 14 Drawing Sheets

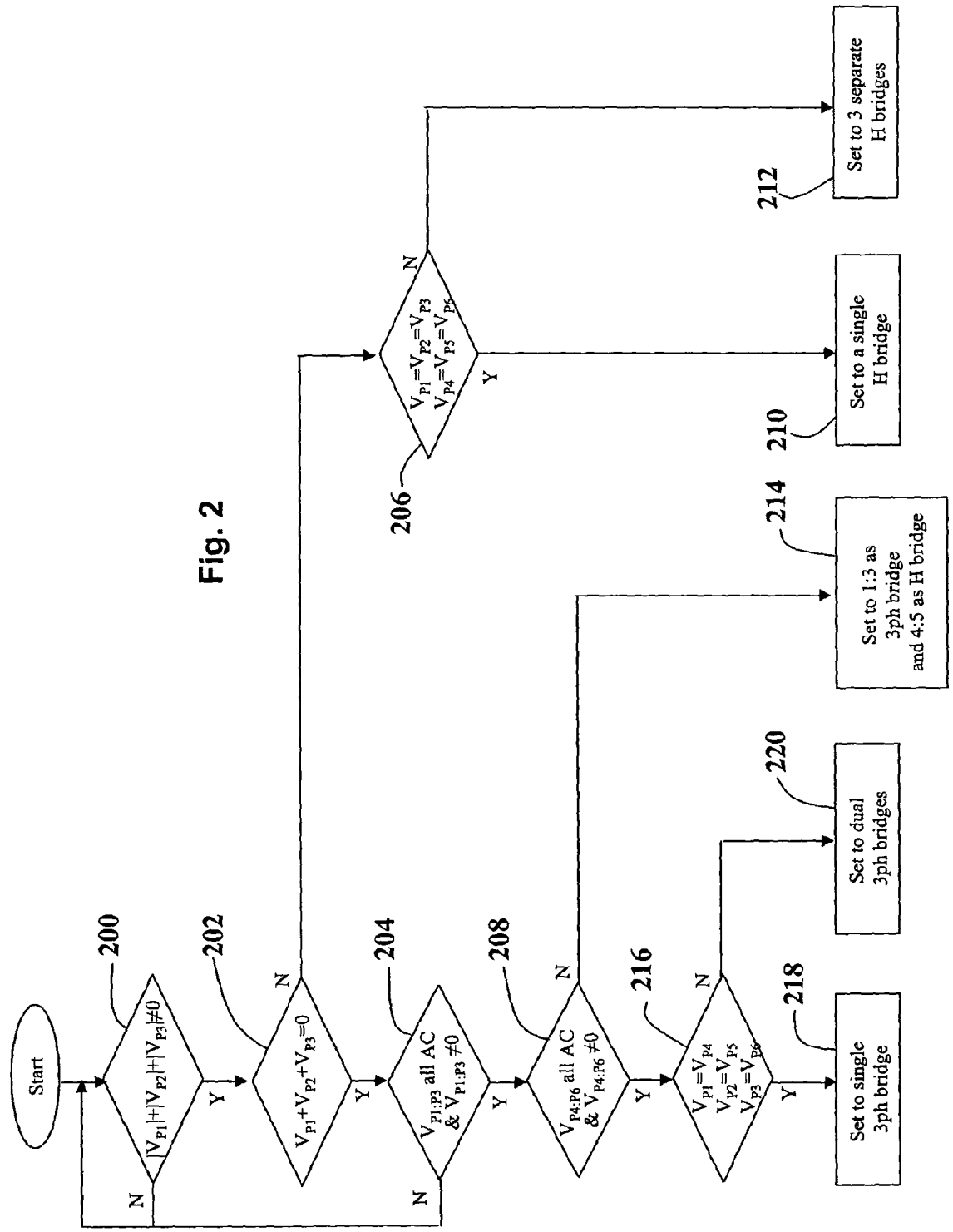

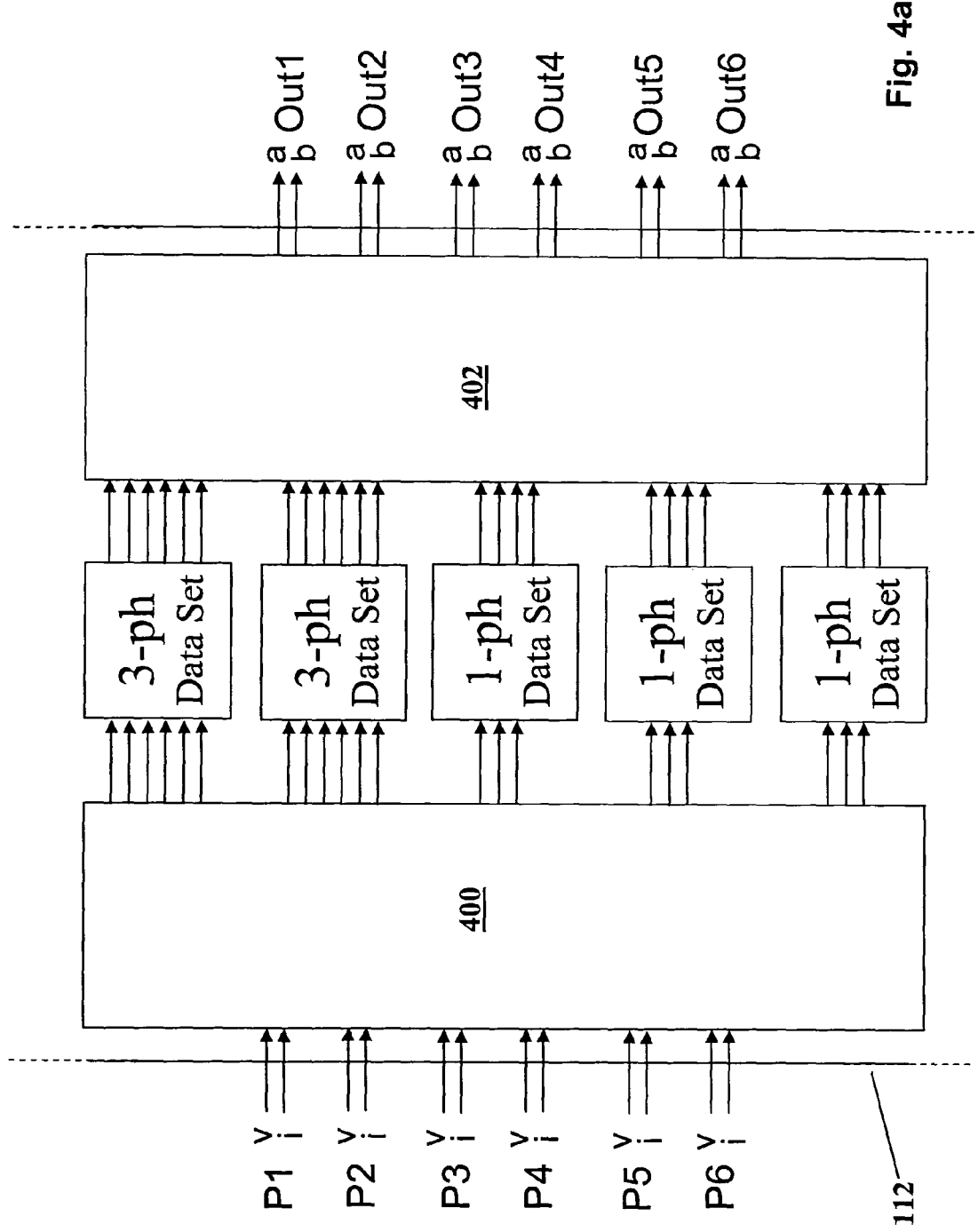

ELECTRICAL ENERGY CONVERTER

FIELD OF INVENTION

This invention relates to an electrical energy converter (hereinafter energy converter) arranged to convert electrical energy from one or more electrical energy sources (hereinafter sources) each of which may generate electrical energy of either a similar or different nature, and may be an energy converter which automatically configures itself to each source to which it is connected.

BACKGROUND OF INVENTION

It is convenient to describe the present invention with reference to an energy converter arranged to convert electrical energy from renewable energy sources to energy which is of a quality such that it may be delivered to either a low or medium voltage distribution network, the national grid, or the like. However the invention need not be so limited, and may apply to an energy converter used to convert electrical energy from any number of further energy sources.

With the continuing drive towards reducing $CO_2$ emissions emitted in the atmosphere as a by-product of energy production facilities, there has been a recent drive towards the use of renewable energy sources. Such sources are generally emission free, however their power output can often be dependent upon external environmental factors, such as the level of sunlight when using a photovoltaic cell, wind strength when using a wind turbine, or the like. It can be advantageous therefore to have the flexibility to use any type of renewable source, and configuration of it, to maximise the potential energy yield from each site where such sources may be located.

Such flexibility is traded-off against having to undertake a complete and time-consuming re-design of the electrical system for each installation, including the choice of electrical energy converter, which would typically be designed to interface with a single renewable energy technology.

It is also often the case that the most appropriate configuration of a given technology is dictated by the surrounding structures and buildings, space availability and visual appearance. For example, a solar photovoltaic installation may operate either as a single solar PV cell array on a flat roof with no shadowing from adjacent structures, or may operate as multiple solar PV cell arrays on different aspects of a building with a pitched roof or where partial shading occurs. The former uses a single input to an energy converter, whilst the latter uses multiple independent inputs in order to capture peak levels of solar energy at different times of the day, as the sun's position changes. The electrical power from each input or source is transferred to the local network, or mains supply.

A common topology for an energy converter that allows bi-directional power flow between two networks of differing voltage frequency or magnitude is a back-to-back pair of Voltage Source Inverters (VSIs). Such energy converters are typically used to allow power flow between an electro-mechanical device and an electrical power distribution system. Whilst a back-to-back VSI converter is suitable for use with wind and hydro turbines, and other rotating AC power sources, the three-phase version, which is typically employed for powers above 5-10 kW, is not suitable for use on DC sources such as solar photovoltaic cell arrays.

Similar energy converters have previously been suggested to convert the varying power supplied by renewable sources. US2004/0125618 describes such an electrical energy converter however it does not address many of the issues detailed above.

SUMMARY OF THE INVENTION

According to a first aspect of the invention there is provided an electrical energy converter arranged to be connected to at least one source of electrical energy and to condition the energy generated by that source to be suitable for feeding to a network to which the converter may be connected, the converter comprising an input conversion stage having at least three input terminals and a controller, the controller being arranged to configure each of the terminals to accept any one of the following input types:
1. a phase of a polyphase supply;
2. one side of a single phase supply;
3. one side of a DC supply; and
4. no-input.

Such a converter is convenient because it can be connected to a variety of different types of electrical energy source and be configured for operation with that or those sources. As such, a single converter may be connected to a variety of different types and/or configurations of electrical energy source.

The input terminals of the input conversion stage may be the input terminals of the energy converter.

Conveniently, the converter comprises at least one and generally a plurality of sensors and in particular there may be at least one sensor associated with each input terminal.

In some embodiments there may be provided sensors arranged to sense more than one parameter of the electrical energy. For example, there may be provided both a current sensor and a voltage sensor.

The input conversion stage may be arranged to process electrical energy input to the converter such that the energy is suitable for being passed across a DC link. DC links are well known to the skilled person and they will appreciate that converting input electrical energy in this manner allows for simpler processing of the energy. Alternative embodiments may be arranged to process the electrical energy to be suitable for being passed across connections other than a DC link. For example, some embodiments may be arranged to process the electrical energy to be passed across a resonant DC link.

In one embodiment the input conversion stage comprises three pairs of switching devices. Providing three pairs of switching devices in this manner allows a three phase supply to be processed by the input conversions stage. Commonly the switching devices within each pair may be referred to as an upper switching device and a lower switching device.

Conveniently, an input terminal to the converter is connected to a junction between the pair of switching devices and as such the pair of switching devices may be thought of as being arranged as half an H-bridge, sometimes referred to as a half-bridge.

In a further embodiment, the input conversion stage comprises six pairs of switching devices, or six half-bridges. If the six half-bridges are controlled as two separate groups of three, two three phase energy sources may be connected to the converter.

In some configurations, the upper switching devices in each pair are operated substantially in unison and the lower switching devices in each pair are operated substantially in unison. In such a configuration the input conversion stage is configured for a DC or a single phase input.

In some configurations the pairs of switching devices may be configured such that an input to the input conversion stage may be applied to more than one pair of switching devices.

Such a configuration is convenient because it can increase the current carrying capacity of the input conversion stage. For example, in one possible configuration of six pairs of switching devices, the switching devices may be configured to be connected to three DC inputs with two pairs of switching devices being assigned to each DC input. However, in another possible configuration of six pairs of switching devices, the switching devices may be arranged such that an input is connected across three pairs of switching devices allowing a single DC or single phase input to be connected but of larger current capacity.

Thus, in an embodiment having six pairs of switching devices in the input stage the pairs of switching devices may be controlled as a three phase bridge having twice the current capacity of each switching device; separate H-bridges for three separate DC or single phase sources; as a one single phase H-bridge having three times the current capacity of each switching device; two three phase bridges; or one three phase bridge together with a DC H-bridge.

In other embodiments there may be other numbers of input terminals but it may be convenient, although not essential, to increment input terminals by three so as to allow three phase sources to be connected to the converter. It may also be convenient to, although not essential, to increment the number of input terminals by six since this gives greater efficiency with which the input terminals can be used when connecting DC or single phase inputs to the energy converter.

The converter may also comprise an output generation stage. The output generation stage may be arranged to process electrical energy received from the input conversion stage to be suitable for outputting from the converter.

In one embodiment the energy converter comprises a DC link connecting the output generation stage to the input conversion stage.

Further, the output generation stage may comprise three pairs of switching devices each of which is controlled by a controller which may or may not be the same as the controller controlling the input conversion stage.

The output generation stage may be arranged to generate an output which is suitable for connecting to a low-voltage or high-voltage distribution network. For example, in one embodiment the output generation stage may be arranged to generate a three phase output generally having a frequency of 50 Hz at substantially 400 Volts.

The controller may be arranged to automatically configure each input terminal to accept the input types. However, in other embodiments, input devices such as switches, buttons, menus perhaps generated by the controller, may be used to configure each terminal as to which input type to accept. Configuration of an input terminal may comprise switching switching devices connected to the input terminal at appropriate times.

The controller may be arranged to determine whether electrical energy applied to an input terminal is AC or DC. Such an arrangement is convenient because it can allow either AC or DC sources to be connected to the converter.

In one embodiment, the controller is arranged to calculate the power factor of an input thereto. In such an embodiment the controller may also be arranged to control the switching devices such that the electrical signal has substantially a unity power factor; i.e. the current and voltage waveforms are substantially in phase with one another, or are out of phase with each other by substantially 180 degrees.

The controller may also comprise a power tracking module arranged to determine the power being output by a source connected to the converter.

The power tracking module may be arranged to cause the controller to control the switching devices to adjust the electrical load placed upon a source connected to the converter.

In one embodiment the power tracking module may be arranged to cause the controller to adjust the load applied to a source in order to optimise the power output of the source. Such an arrangement is convenient because it can allow more efficient use of the source.

In some embodiments there may be more than one power tracking module, each of which may be applicable for a different input type. For example, a power tracking module suitable for use with a single phase/DC input is unlikely to be suitable for use with a polyphase supply.

According to a second aspect of the invention there is provided a controller arranged to be used in the energy converter according to a first aspect of the invention.

According to a third aspect of the invention there is provided a method of converting electrical energy generated by source thereof to a form suitable for being connected to a network comprising controlling an input conversion stage of a controller according to the input type of the electrical energy wherein the input type may be any one of the following: a phase of a polyphase supply; a single phase supply; a DC supply; and no input.

According to a fourth aspect of the invention there is provided a machine readable data carrier containing instructions which when read onto a machine cause that machine to perform as the converter of the first aspect of the invention or as the controller of the second aspect of the invention.

According to a fifth aspect of the invention there is provided a machine readable data carrier containing instructions which when read onto a machine cause that machine to perform the method of the third aspect of the invention.

A machine readable data carrier may be any carrier suitable for reading by a machine and includes any of the following: a floppy disk, a CDROM, a DVD (including −R/−RW, +R/+RW and RAM), a hard drive, a memory (such as a USB key, memory cards such as SD cards, Compact Flash, etc.), tape, any form of magneto-optical storage, a transmitted signal (such as Internet download, FTP transfer and the like), a wire.

BRIEF DESCRIPTION OF THE DRAWINGS

There now follows, by way of example only, a detailed description of embodiments of the present invention with reference to the accompanying drawings in which:

FIG. 2 shows a flow diagram of a method of initialising the embodiment of FIG. 1;

FIGS. 4a and 4b show a block diagram of an embodiment of the control means and the selection of data for data-sets;

DETAILED DESCRIPTION OF THE DRAWINGS

Figure 1A:
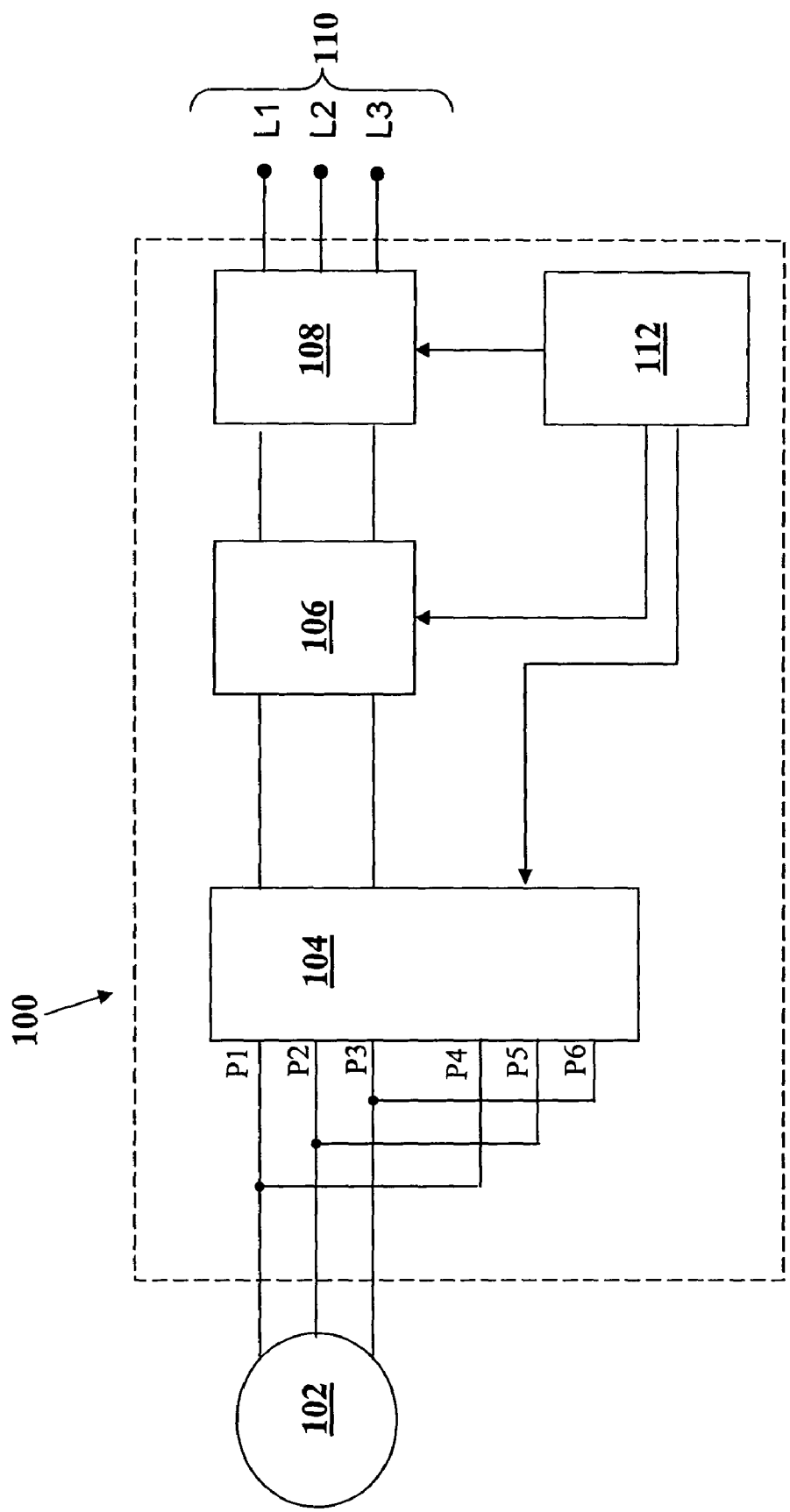
FIGS. 1a to 1e show block diagrams of different arrangements of an energy converter of an embodiment of the invention.

FIG. 1 shows an embodiment of an energy converter 100 which comprises an input conversion stage 104, a DC link 106 and an output generation stage 108. A source 102 is connected to the DC link 106 via the input conversion stage 104. The DC link 106 is additionally connected to the output generation stage 108 such that electrical energy may be transferred from the source 102 via the input conversion stage 104 to the output generation stage 108. The output generation stage 108 is further arranged to connect to an output network 110.

The output network 110 is not shown in detail here, however a typical output network 110 may have a plurality of phases, the most common being three-phase (3Φ), or may be single phase, such as either AC or DC. Such power networks are well known and are described in detail elsewhere. In one embodiment the output network 110 is a three-phase supply or distribution network commonly referred to as a grid.

The energy converter 100 also comprises a controller 112 which controls the operation of the input conversion stage 104 and output generation stage 108.

In the embodiment of FIG. 1 the input conversion stage 104 is formed by two three-pole Voltage Source Inverters (VSIs) each of which is arranged to convert the power output from the electrical energy source 102 to a DC output from the input conversion stage 104. The combined VSI therefore comprises six poles. A VSI pole comprises an input terminal of the input conversion stage 104 and two outputs. The two outputs in the present embodiment are connected to high and low rails of the DC link respectively. The VSI pole further comprises two switching devices (which would generally be semiconductor switches), which are connected in series between the outputs of the VSI. Each input terminal is labelled P1 through to P6 in the Figures. The input terminal is connected to a junction between the switching devices and this arrangement can be referred to as half an H-bridge, or half-bridge.

In the configuration of the embodiment shown in FIG. 1(a), the six-pole VSI is operated as three inverter pairs of poles, where each phase has a pair of poles operating in parallel. This effectively shares the load of transferring electrical power between each of the poles with the pair. The controller 112 is arranged to monitor the load arising from each source connected to the input conversion stage 104 to ensure that the power limit of the DC link and/or output generation stage is not exceeded.

In this example, the source is an electro-mechanical device and in the context of this description an energy source may able to sink and/or store energy.

The skilled person will appreciate that semiconductor switching devices may use any form of semiconductor switching device, typically FETs or IGBTs or the like. Further, it is likely that each switching device is arranged such that there is a parallel free-wheeling diode arranged to provide a current path when the switching device is switched to the off state. A person skilled in the art will know how to implement such an input conversion stage 104 using commercially available switching device packages which may be two full bridge (or three-phase) modules, three H-bridge modules, six half-bridge modules, twelve discrete devices, or any combination thereof.

In the configuration shown in FIG. 1(a), input terminals P1 & P4, P2 & P5 and P3 & P6 are connected together as pairs and the controller 112 is arranged to control the connected input terminals as common terminals. Connecting the input terminals as three pairs of terminals in this manner allows the input conversion stage 104 to pass a higher power when compared to using only three input terminals as an input.

Figure 1B:
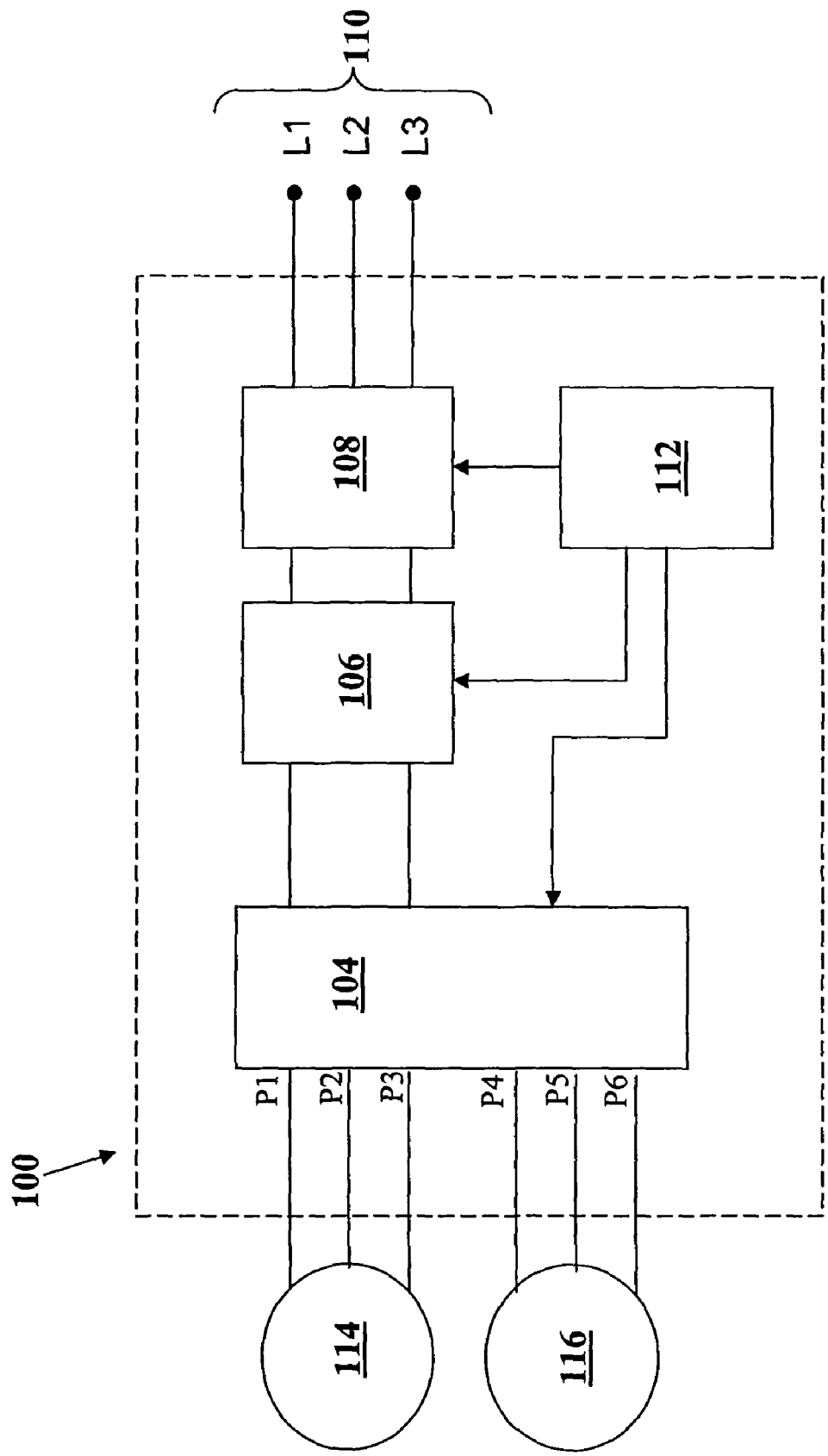

FIG. 1(b) shows a second configuration of the energy converter 100. Whereas the first input configuration, shown in FIG. 1(a), connects a single three-phase source 102, the second configuration illustrated in FIG. 1(b) allows two independent three-phase sources 114, 116 to be connected to the output network 110 via the electrical energy converter 100. The two sources 114, 116 are connected to the DC link 106 via the input conversion stage 104 operating as two independently controlled three-phase VSIs. In this configuration, input terminals P1, P2 & P3 and P4, P5 & P6 are controlled, by the controller 112, as two separate three-phase bridges. Although the formation of two independently controlled three-phase VSIs in the input conversion stage 104 allows greater flexibility, the equivalent power rating per source is half of the combined converter rating; i.e. the configuration shown in FIG. 1(a).

Figure 1C:
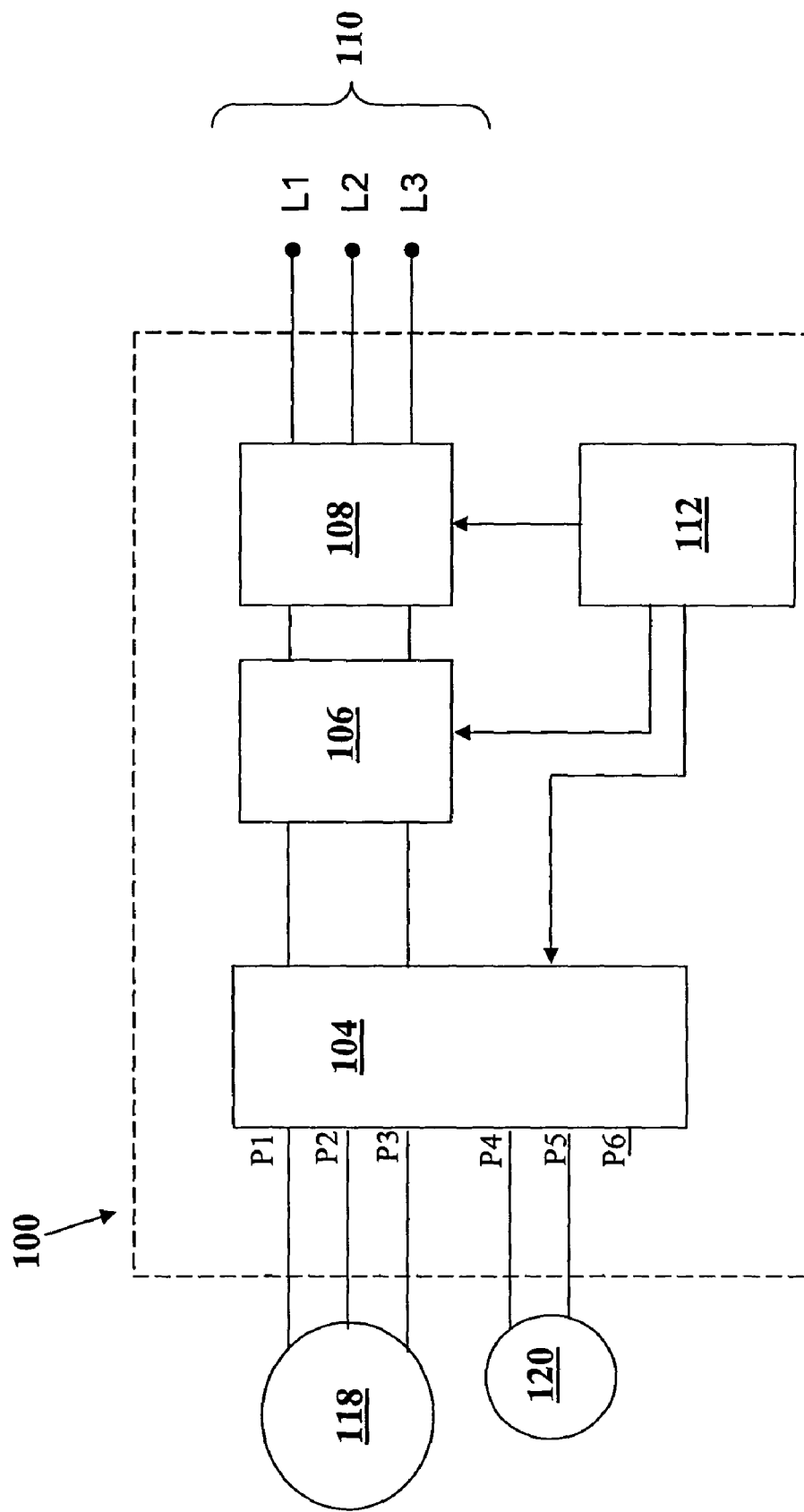

FIG. 1(c) shows a third configuration of the energy converter 100. This third configuration shows two independent sources 118, 120 connected to the output network 110 via the energy converter 100. In the configuration shown in this Figure the first of these sources 118 is a three-phase source and the second of these sources 120 is a single phase source i.e. a single AC source or DC source. A skilled person will appreciate that the half H-bridges within the input conversion stage 104 are able to convert an AC voltage to a DC voltage, or equally step-up, or pass a DC voltage applied to its inputs.

In this configuration, input terminals P1, P2 & P3 are controlled as a three-phase bridge, and input terminals P4 & P5 as a separate H-bridge (since source 120 comprises a single phase or a DC source). Input terminal P6 is not connected.

Figure 1D:
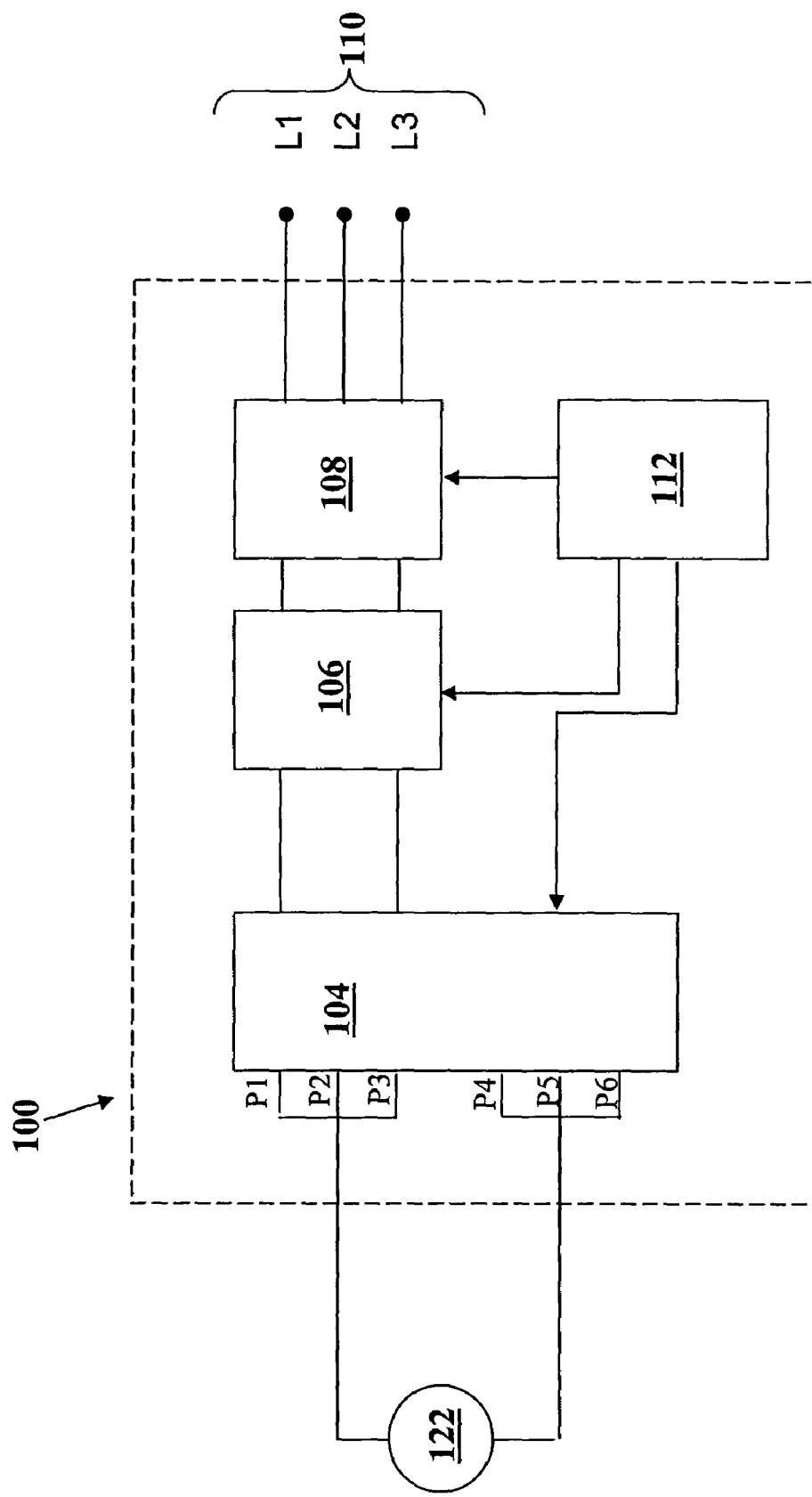

FIG. 1(d) shows a fourth configuration of the energy converter 100. In this configuration a single phase source 122, such as a DC source is connected to the output network 110 via the energy converter 100. In this configuration, terminals P1, P2 & P3, and P4, P5 & P6 are connected together and controlled, by the controller 112, such that the switching devices associated with the input terminals P1, P2 and P3 act in unison, simulating one arm of an H-bridge (so called half H-bridge) and the switching devices associated with the input terminals P4, P5 and P6 act in unison, simulating the complementary arm of the H-bridge. In this configuration the current rating of each of the simulated half H-bridges is three-times greater than that of a single half H-bridges in the VSI.

Figure 1E:
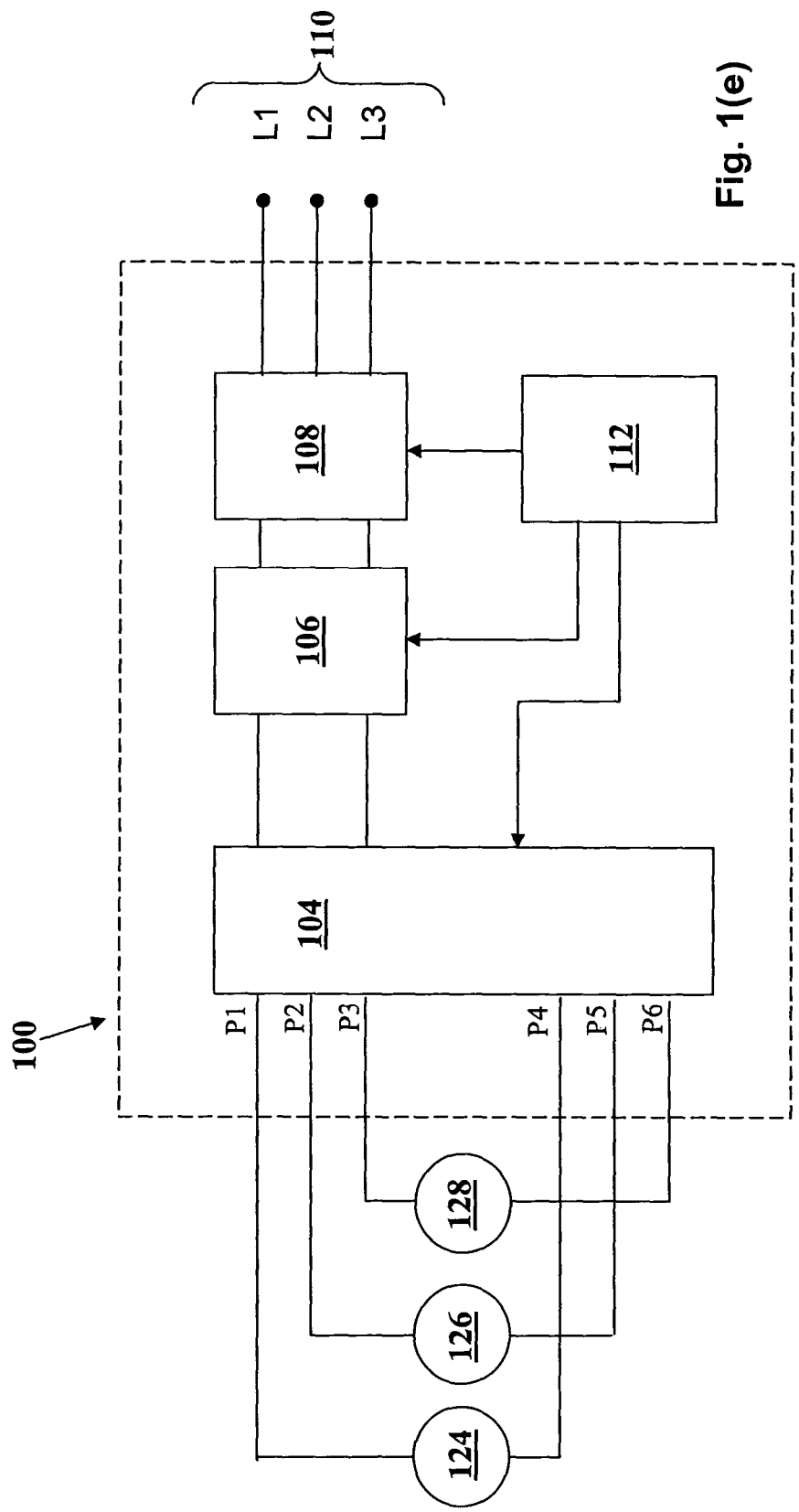

FIG. 1(e) shows a fifth configuration of the energy converter 100. In this configuration three single phase sources 124, 126, 128, AC and/or DC sources, are connected to the output network 110 via the energy converter 100. In this configuration the six-pole VSI is configured as three separate H-bridges and as such terminals P1 & P4, P2 & P5 and P3 & P6 are controlled as the input terminals to each H-bridge.

Other configurations of the energy converter 100 may also be possible and FIGS. 1(a) to 1(e) are exemplary only. However, good and safe working practice will be encouraged by ensuring that the user has prerequisite knowledge of each permitted configuration, when connecting sources. Whilst in some embodiments of the energy converter an automatic detection module 710 will automatically detect which configuration has been connected, there is in the embodiment being described a limited number of permitted configurations to ensure that the connection is clear, obvious and easily identifiable by further users. The automatic connection detection module 710 may also detect whether an incorrect or faulty connection is made.

Considerable design effort is likely to be avoided if an energy converter 100 is capable of interfacing to a wide range of energy source configurations and therefore to a wide range of renewable energy technologies, and configurations thereof, particularly if the energy converter 100 automatically configures itself to the source regardless of its type. Such an arrangement may be advantageous where different kinds of sources are provided at a particular site, such as the combination of wind turbines and PV cells.

As will be appreciated by the skilled person, the output generation stage 108 used for a three phase network comprises three pairs of switching devices (which would generally be semiconductor switches) arranged in three parallel pairs, with each of the switching devices in each pair being arranged in series.

Figure 8:
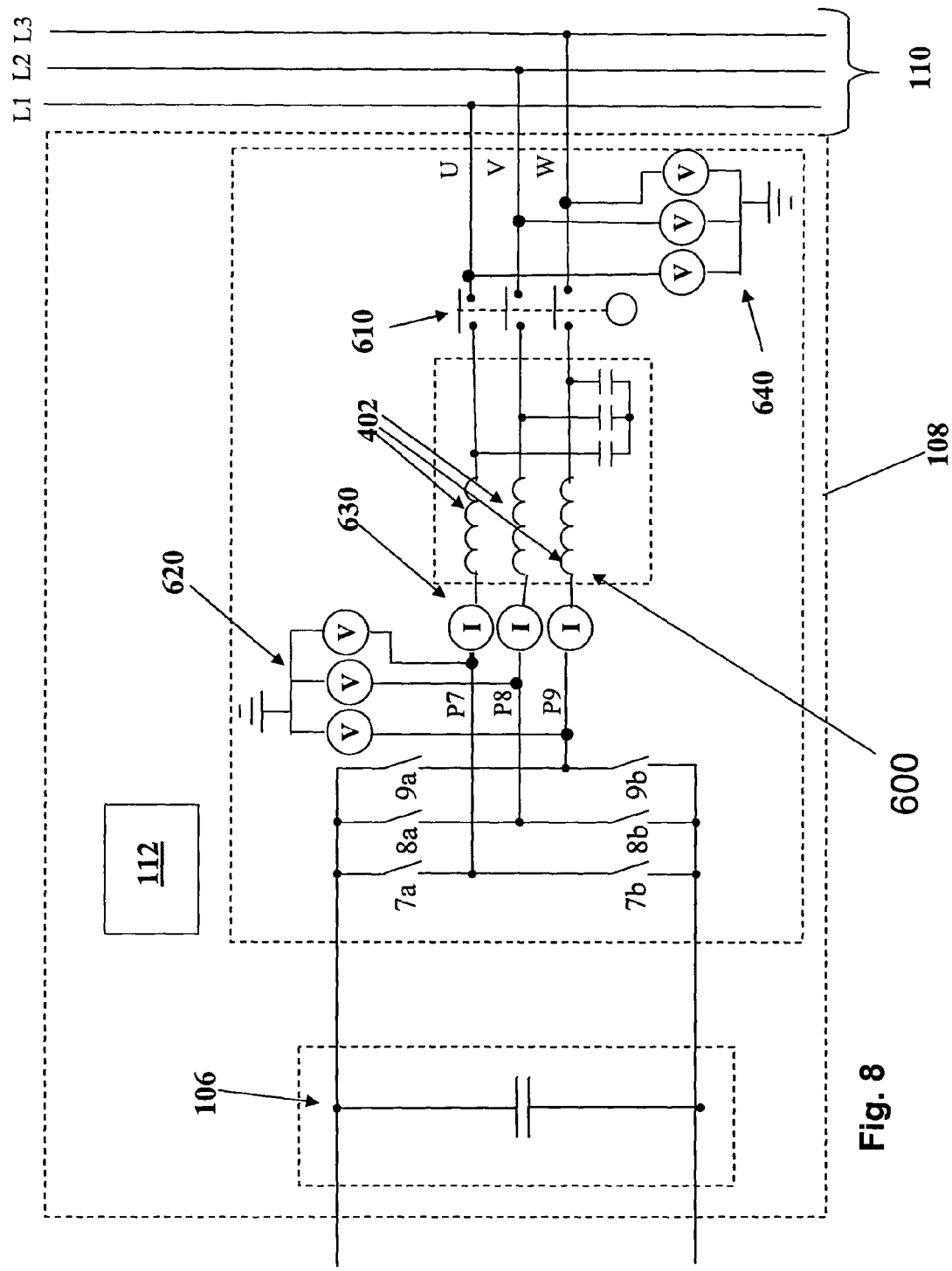
FIG. 8 shows a block diagram of an embodiment of the switching devices and LC filter within the output generation stage of an electrical energy converter.

This is illustrated in FIG. 8. The input to the output generation stage 108, from the DC link 106, is applied across the pairs of switching devices and the output from the output generation stage 108 is taken from a junction between each of the switching devices in each pair.

Different configurations of the energy converter 100 may allow a diverse range of sources to be connected to the output network 110. For example the sources may be any one, or combination of the following list: wind turbine-generator; photoelectric cell; fuel cell; turbine-generator; hydro turbine-generator; wave turbine-generator, biomass-generator, any electro-mechanical energy conversion device, or any suitable energy conversion device.

In the embodiment of the energy converter 100 being described, an initialisation procedure may be used to determine an appropriate configuration of the energy converter 100 for the sources which are connected to the input conversion stage 104. This initialisation procedure is described with reference to FIG. 2.

In this embodiment, the controller 112 senses, in this case automatically, the no-load voltage generated by a source connected to the input terminals P1 to P6 and selects one of the permitted configurations. This is achieved using the following steps:

200: Is an external circuit active, i.e. is there an external voltage source connected to any of the input terminals P1-P6? If not, do not auto-configure or enable and remain in step 200; if so proceed to step 202.

202: Is the voltage applied to input terminals P1, P2 & P3 balanced, as for a 3-phase source? If so, proceed to step 204; if not, proceed to step 206.

204: Are the phase voltages applied to input terminals P1, P2 & P3 from an AC source with non-zero voltage? If not, do not auto-configure or enable and return to step 200; if so, proceed to step 208.

206: Is the voltage applied to input terminals P1, P2 & P3 the same, and is the voltage applied to input terminals P4, P5 & P6 the same? If so, configure as a simulated single H-bridge, where input terminals P1, P2 & P3 and input terminals P4, P5 & P6 are operated in parallel (210)—as shown in FIG. 1(*d*); if not, then configure as a three separate H-bridge circuits, where input terminals P1 & P4, P2 & P5, and P3 & P6 are paired (212)—as shown in FIG. 1(*e*).

208: Are the phase voltages applied to input terminals P4, P5 & P6 from an AC source with non-zero voltage? If not, configure as a three-phase VSI on input terminals P1, P2 & P3 and a H-bridge of input terminals P4 & P5 (214)—as shown in FIG. 1(*c*); if so, proceed to step 216.

216: Is the voltage applied to input terminals P1, P2 & P3 the same as input terminals P4, P5 & P6? If so, configure as a single parallel three-phase VSI (218)—as shown in FIG. 1(*a*); otherwise as two separate three-phase VSIs (220)—as shown in FIG. 1(*b*).

The energy converter 100 is controlled by the controller 112 shown in FIG. 1. Typically, the controller 112 will include analogue and digital circuits, the latter part including a processor 700, such as an embedded micro-processor or micro-controller e.g. a DSP, PIC, FPGA, or the like. Such devices will be readily appreciated to a person skilled in the art. Examples of such devices include a TMS2000 motor control DSP, manufactured by Texas Instruments, or a dsPIC, manufactured by Microchip etc.

The code that is processed by the processor 700 will probably be stored in non-volatile memory 800 on the processor 700, however other forms of non-volatile memory 800 may be used which could be connected to the processor 700 from within the controller 112, or connected to the controller 112 over a network connection.

Communications capabilities may also be provided for monitoring and firmware up-dates. For example the controller may be provided with networking capabilities. These capabilities may be wired or wireless. The controller 112 may be arranged to connect to a local area network, wider area network, or the Internet or the like. The controller 112 may be provided with a unique identifier, such as a MAC address, or IP address, and may be arranged to receive software/hardware updates from a remote server. Alternatively, or in addition, the controller 112 may be arranged to contact a remote server of its own initiative. The controller may further be arranged such that the data controlling the operation, or data measurements of the controller 112 may be transferred and viewed remotely. This may occur in real time. A person skilled in the art will readily appreciate how to implement such a controller 112.

The controller 112 is connected to, communicates with and monitors the input conversion stage 104 and the output generation stage 108; whilst the DC link 106 voltage is monitored by the controller 112 via a voltage sensor 310. The controller 112 is arranged to generate switching waveforms which are communicated to the input conversion stage 104 and output generation stage 108 to control the switching devices therein. The controller 112 is also arranged to monitor current sensors 304 and voltage sensors 306, denoted V1 to V6 and 11 to 16 on terminals P1 to P6 within the input conversion stage 104 and both a current 630 and voltage sensor 620 on each output terminal in the output 108 stage, as well as the voltage on a voltage sensor 640 of the output network. The controller 112 is also arranged to generate supervisory control signals such as enable and fault, etc. which can be communicated therefrom.

Figure 3:
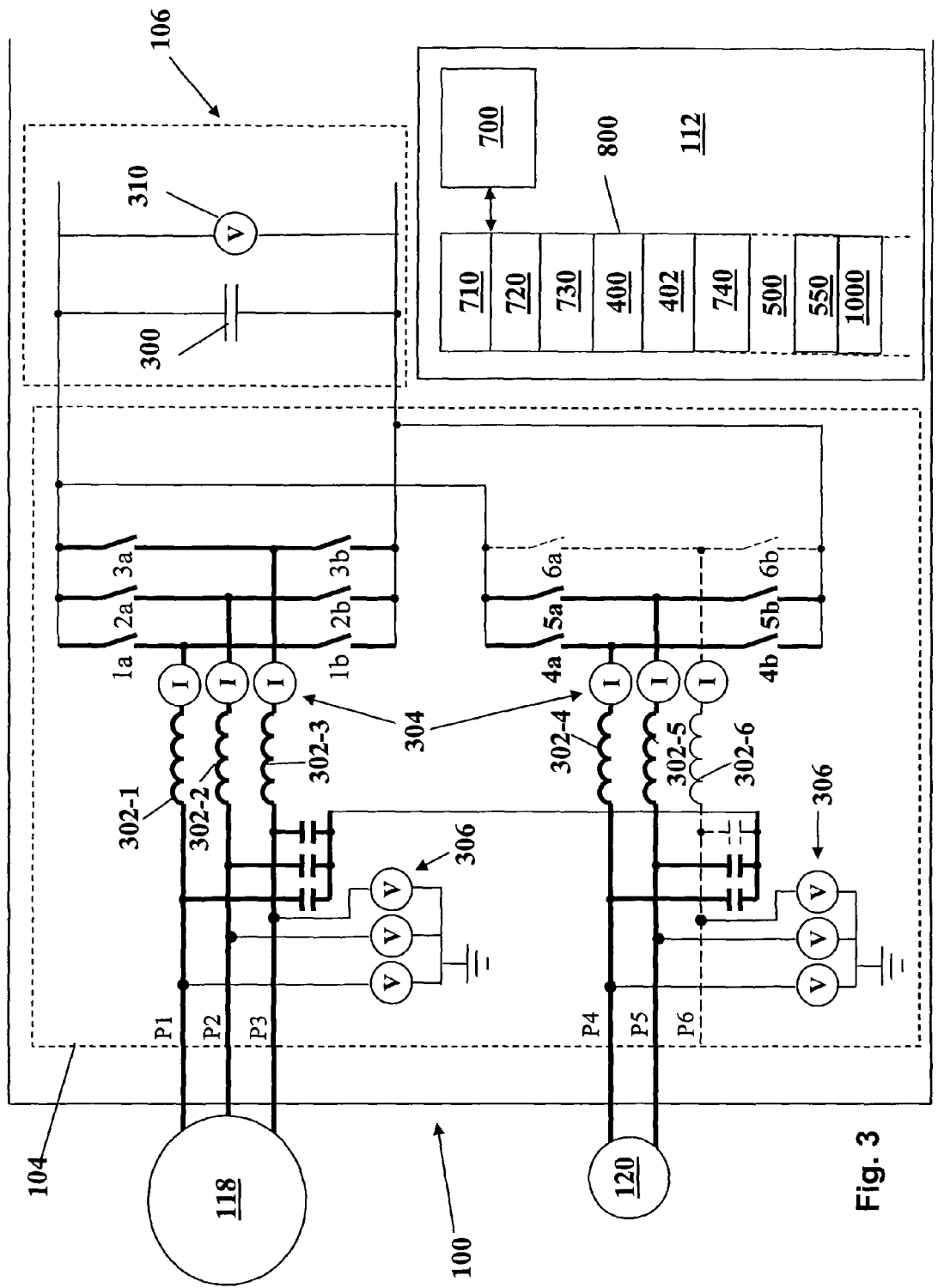
FIG. 3 shows a block diagram of an embodiment of the switching devices and LC filter within the input conversion stage of an energy converter.

FIG. 3 shows the arrangement of the switching devices within the input conversion stage 104; i.e. two three-pole VSI converters, each comprising six switching devices arranged in three parallel pairs, with each of the switching devices in each pair being arranged in series. There are therefore 12 switching devices in total.

The input terminal P1 connects to the pair of switching devices 1*a* and 1*b*; the input terminal P2 connects to the pair of switching devices 2*a* and 2*b*; the input terminal P3 connects to the pair of switching devices 3*a* and 3*b*; the input terminal P4 connects to the pair of switching devices 4*a* and 4*b*; the input terminal P5 connects to the pair of switching devices 5*a* and 5*b*; and the input terminal P6 connects to the pair of switching devices 6*a* and 6*b*.

Thus, the controller 112 supplies 12 Pulse Width Modulated (PWM) switching sequences (i.e. one switching sequence for each of the switching devices in the input conversion stage 104). For the sake of clarity the connections from the switching devices to the controller 112 are not shown.

The input conversion stage 104 also comprises a filter inductor 302-1 to 302-6; i.e. one for each pole of the VSI. The filter inductor is connected in series between the input terminal and the junction between each of the switching devices within a pair of switching devices. The skilled person will appreciate that in view of the reactance of the source and/or filter inductance the energy sources should generally be viewed as current sources rather than as voltage sources.

The state of each switching device is controlled to either block voltage Car state) or conduct current ('on' state) and each switching device within a pair is switched in a complementary manner to avoid both switches being in the 'on' state at the same time which would cause a short-circuit path for the voltage existing across the DC link 106.

As is well known in the art, the DC link 106, which comprises a capacitor 300 in the present embodiment, is arranged to transmit the DC power from the output of the input conversion stage 104 to the input of the output generation stage 108.

The configuration shown in FIG. 3 shows a three-phase bridge (using inverter input terminals P1, P2 & P3) and an H-bridge (using inverter input terminals P4 & P5) and is the same as the configuration shown in FIG. 1(c). FIG. 3 also schematically shows the internal components of the input conversion stage 104.

Thus, it can be seen that in the configuration of FIG. 1(a) the switching devices are operated as two banks of three pairs of switching devices wherein an input to the input conversion stage 104 is applied to the input terminals of two of the pairs of switching devices. This allows a three phase supply to be connected to the input conversion stage 104, wherein each phase of the three phase supply is applied to two of the pairs of switching devices.

In the configuration of FIG. 1(b) the switching devices are operated as two banks, each comprising three pairs of switching devices wherein an input to the input conversion stage 104 is applied to the input terminal of a pair of switching devices. This allows at least one, and generally two, three phase supplies to be connected to the input conversion stage 104, wherein a phase of a three phase supply is applied to the input terminal of a pair of switching devices.

In the configuration of FIG. 1(c) the switching devices are operated to include a bank of two pairs of switching devices wherein an input to the input conversion stage 104 is applied to the input terminal of each pair of switching devices in the bank. This allows a DC supply or a single phase supply to be connected to the input conversion stage 104 wherein the DC supply or single phase supply is applied to the input terminal of each pair of switching devices in the bank.

Also in the configuration of FIG. 1(c) the switching devices are operated to include a bank of three pairs of switching devices wherein an input to the input conversion stage 104 is applied to the input terminal of a pair of switching devices in the bank. This allows a three phase supply to be connected to the input conversion stage 104, wherein a phase of the three phase supply is applied to the input terminal of a pair of switching devices in the bank.

In the configuration of FIG. 1(d) the switching devices are operated as two banks, each comprising three pairs of switching devices wherein an input to the input conversion stage 104 is applied to the input terminal of each pair of switching devices in a bank. This allows a single DC supply or a single phase supply to be connected to the input conversion stage 104 and is applied to the input terminal of each pair of switching devices in a bank.

In the configuration of FIG. 1(e) the switching devices are operated as three banks each comprising two pairs of switching devices, wherein an input to the input conversion stage 104 is connected between the input terminals of one of the banks. This allows three single phase or DC supplies to be connected to the input conversion stage 104, wherein each single phase or DC supply is connected between the input terminals of one of the banks.

It can be seen from FIG. 3 that each of the input terminals has associated therewith both a current sensor 304 and a voltage sensor 306. These read the current passing through each input terminal (P1 to P6) and the voltage on each of these input terminals (P1-P6) in relation to a suitable ground or earth and feed all this data back to the controller 112.

The twelve switching devices (labelled as 1a and 1b through to 6a and 6b) are controlled, by the controller 112, to alter the magnitude and shape of the current waveforms through the filter inductors 302 irrespective of whether this is AC or DC. In the embodiment shown in FIG. 3, the three-phase source 118 is an AC source such as that generated from a driven turbine-generator, whilst the single-phase source 120 is a DC source such as that generated from a Photo Voltaic Cell, fuel cell, rectified driven turbine-generator or the like.

The controller 112 performs a number of tasks, one of which is current control for the input conversion stage 104; the controller 112 is arranged to condition the current that is drawn from the or each source connected to the input conversion stage 104. As described in relation to FIG. 1 the input conversion stage 104 can be configured to take a number of different sources as an input and as such the controller 112 is arranged to perform a plurality of different operations, including current control on a three-phase bridge (three inverter poles connected to the DC link 106 or other common DC voltage) and or current control on a single-phase bridge, or so called H-bridge (two inverter poles connected to the DC link or other common DC voltage). The control used in each arrangement is detailed further later in the text and in FIGS. 5 and 7.

In some embodiments multiple instances of either three-phase control module 720 or H-bridge control module 730 may be used on the controller 112 to provide functionality, such as in the embodiments in FIGS. 1(b) and 1(e). In the embodiment being described, multiple instances of the three-phase and/or the H-bridge current control are provided by creating two separate modules which are generally provided as software modules: one three-phase bridge module 720 and one H-bridge module 730. In such cases, rather than providing an alternative module, or collection of modules for each alternative configuration permutation, a separate data-set is provided for each instance thereof or source connected to the input conversion stage 104.

FIG. 4a shows how one embodiment of the invention may implement multiple data-sets to enable the input conversion stage 104 to operate in the configurations shown in FIG. 1. In this case the controller 112, comprises an input selector 400 and an output selector 402. The input selector 400 is arranged to receive parametric data from the current sensors 304 and the voltage sensors 306, and is arranged to sample and store the various time dependent parameters based upon the configuration of the energy converter 100. As such, the input selector 400 allows the controller 112 to utilise readings from predetermined sensors according to the configuration of the switching devices that are appropriate for the sources connected to the input conversion stage 104. The input conversion stage 104 is configured via the process detailed in FIG. 2. The parametric data is then assigned to a data-set depending upon the configuration. Each data-set may be stored in a data-set module 740 on the controller 112 or the like.

In the case of a single phase data-set, three alternative parameters are used, $V_A$, $V_B$, and $I_A$. These parameters indicate the voltage on each input terminal to which a single-phase source is connected, as well as the current flowing on one of the inputs terminals (since this will be the same magnitude, but opposite sense on each input terminal). It will readily be appreciated that in certain circumstances these parameters may be a concatenation of several input terminal values. For example, in the configuration shown in FIG. 1(d), the parameter $I_A$ will be a concatenation of the currents flowing on P1, P2, and P3. This data may be sampled at intervals, and thus give an indication of the waveform of the electrical energy from the single phase energy source.

In the case of a three-phase data-set, parameters $V_A$, $V_B$, $V_C$, $I_A$, $I_B$, $I_c$ are obtained. It will readily be appreciated that these parameters relate to the voltage and current of each phase of the energy source. Again, in some instances, namely that described in FIG. 1(a), the parameters may be a concatenation of values obtained from the current sensors 304.

The controller 112 is arranged to process each data-set using either the three-phase control module, 720 or the H-bridge control module 730. The functionality of each control module 720, 730 is shown in further detail in FIGS. 5 and 7. In the case where only energy sources of the same configuration (i.e. single phase or three phase) are connected, then the control modules 720, 730 are arranged to evaluate the relative outputs from one data-set, then compute the outputs from the next data-set. The data output from the control module 720, 730 can then be used in the output selector 402 to control the appropriate switches 1a,b to 6a,b. It will be appreciated that the input data parameters are obtained, and the outputs are computed at sufficiently small intervals to provide effective pulse width modulation of the electrical signal by the switches.

Applying multiple data sets to a single piece of code for either three-phase or H-bridge current control in this manner is believed to be more efficient in the amount of code that is needed.

The data-set assigned to a source may also comprise data such as the control parameters, state, input, error and output variables, amongst others. The data set is updated when applied to the appropriate control module 720, 730.

The output selector 402 of the controller 112 is then arranged to process the switching patterns provided by the relevant control module 720, 730 to drive the twelve input conversion stage 104 switching devices 1a,b to 6a,b within the present embodiment. It will be appreciated that in the case of a single phase data-set, two half-bridges are controlled, giving output controls X and Y, each with two switch controls. In the case of a three-phase data set, X, Y, and Z outputs are used to provide switching information for three half-H-bridges: X, Y and Z—again each comprising a first "a" and a second "b" switching signal; i.e. one for each of the switching devices in each pair of switching devices. The output selector 402 is arranged to attribute these output controls to each relevant switch, Out 1 to 6, each with an 'a' and a 'b'.

Table 1 and Table 2 details the various configurations of data-sets, and details the input and output data respectively.

TABLE 1

Assigning feedback sensors to data set for current controller input variables

| Config. | Data set 1: 3-ph bridge | Data set 2: 3-ph bridge | Data set 3: H-bridge | Data set 4: H-bridge | Data set 5: H-bridge |
|---|---|---|---|---|---|
| 1 | Inputs:<br>$I_A$ $I_{P1} + I_{P4}$<br>$I_B$ $I_{P2} + I_{P5}$<br>$I_C$ $I_{P3} + I_{P6}$<br>$V_A$ $V_{P1}$<br>$V_B$ $V_{P2}$<br>$V_C$ $V_{P3}$ | Disabled | Disabled | Disabled | Disabled |
| 2 | Inputs:<br>$I_A$ $I_{P1}$<br>$I_B$ $I_{P2}$<br>$I_C$ $I_{P3}$<br>$V_A$ $V_{P1}$<br>$V_B$ $V_{P2}$<br>$V_C$ $V_{P3}$ | Inputs:<br>$I_A$ $I_{P4}$<br>$I_B$ $I_{P5}$<br>$I_C$ $I_{P6}$<br>$V_A$ $V_{P4}$<br>$V_B$ $V_{P5}$<br>$V_C$ $V_{P6}$ | Disabled | Disabled | Disabled |
| 3 | Inputs:<br>$I_A$ $I_{P1}$<br>$I_B$ $I_{P2}$<br>$I_C$ $I_{P3}$<br>$V_A$ $V_{P1}$<br>$V_B$ $V_{P2}$<br>$V_C$ $V_{P3}$ | Disabled | Inputs:<br>$I_A$ $I_{P4}$<br>$V_A$ $V_{P4}$<br>$V_B$ $V_{P5}$ | Disabled | Disabled |
| 4 | Disabled | Disabled | Inputs:<br>$I_A$ $I_{P1}+$<br>$I_{P2}+$<br>$I_{P3}$<br>$V_A$ $V_{P1}$<br>$V_B$ $V_{P4}$ | Disabled | Disabled |
| 5 | Disabled | Disabled | Inputs:<br>$I_A$ $I_{P1}$<br>$V_A$ $V_{P1}$<br>$V_B$ $V_{P4}$ | Inputs:<br>$I_A$ $I_{P2}$<br>$V_A$ $V_{P2}$<br>$V_B$ $V_{P5}$ | Inputs:<br>$I_A$ $I_{P3}$<br>$V_A$ $V_{P3}$<br>$V_B$ $V_{P6}$ |

TABLE 2

Assigning data set controller outputs to switching devices

| Config. | Data set 1: 3-ph bridge | Data set 2: 3-ph bridge | Data set 3: H-bridge | Data set 4: H-bridge | Data set 5: H-bridge |
|---|---|---|---|---|---|
| 1 | Outputs:<br>X 1&4<br>Y 2&5<br>Z 3&6 | Disabled | Disabled | Disabled | Disabled |
| 2 | Outputs:<br>X 1<br>Y 2<br>Z 3 | Outputs:<br>X 4<br>Y 5<br>Z 6 | Disabled | Disabled | Disabled |
| 3 | Outputs:<br>X 1<br>Y 2<br>Z 3 | Disabled | Outputs:<br>X 4<br>Y 5 | Disabled | Disabled |
| 4 | Disabled | Disabled | Outputs:<br>X 1, 2&3<br>Y 4, 5&6 | Disabled | Disabled |
| 5 | Disabled | Disabled | Outputs:<br>X 1<br>Y 2 | Outputs:<br>X 3<br>Y 4 | Outputs:<br>X 5<br>Y 6 |

As discussed above the two switching devices connected to each inverter input terminals (i.e. P1 through P6) are denoted as 'a' and 'b' for top and bottom switches respectively—as shown in FIG. 3. Again the assignment in Table 2 for each output from a data-set (X, Y or Z) includes complementary outputs for a and b.

Figure 4B:
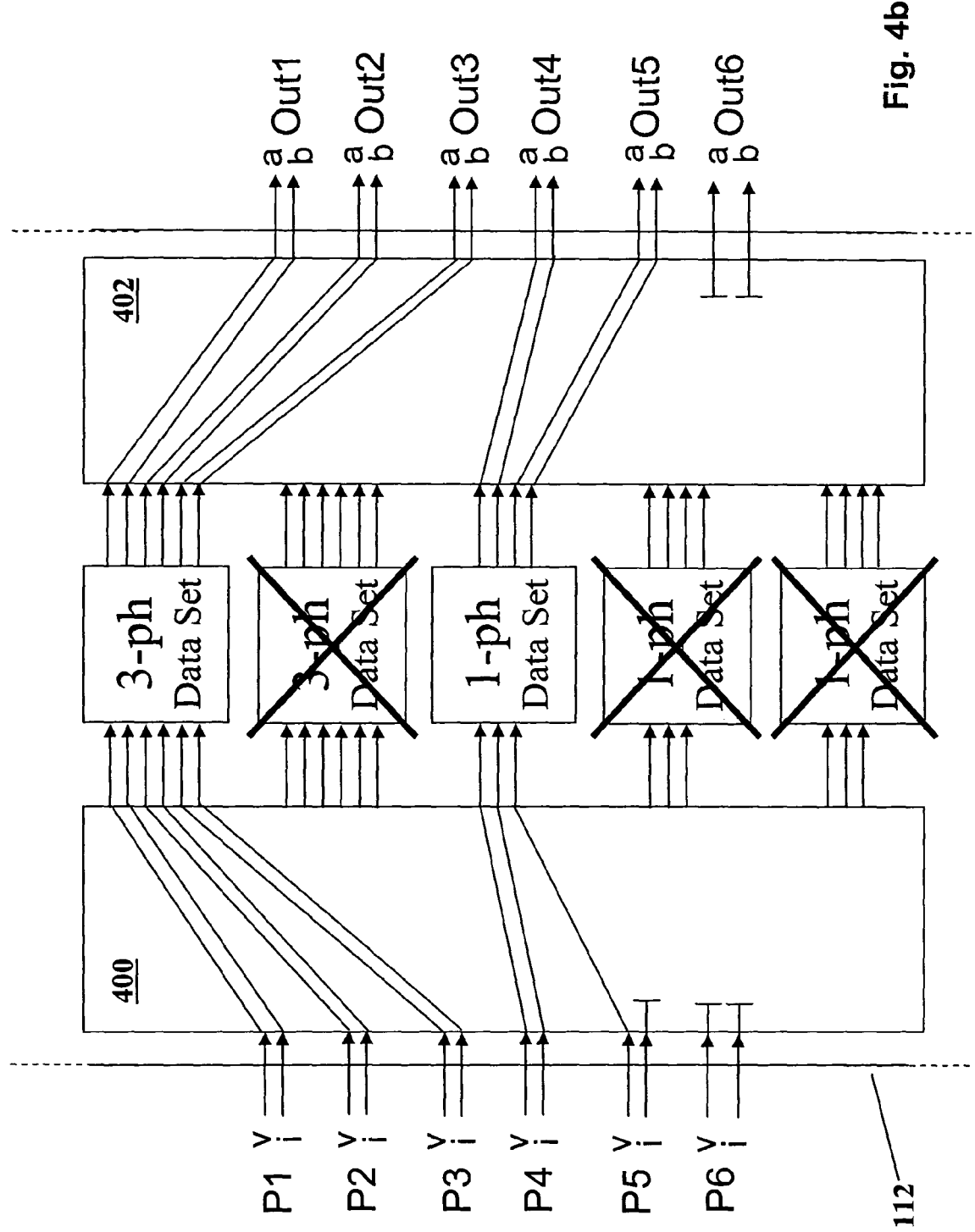

FIG. 4(b) shows a representation of a data-set configuration used when controlling the arrangement shown in FIG. 1(c) and FIG. 3, and detailed in configuration 3 of Tables 1 and 2. In such an arrangement the input selector 400 is arranged to feed the parameters, V (voltage) and I (current), observed on the input terminals P1, P2 and P3 to a first three-phased data set. Similarly, the input selector 400 is arranged to feed the V and I parameters observed on the input terminals P4 and P5 to a first H-bridge data set. The data in each data-set is processed to provide a switching pattern. The output selector 402 is arranged to provide switching patterns of each of the relevant switches.

Figure 5:
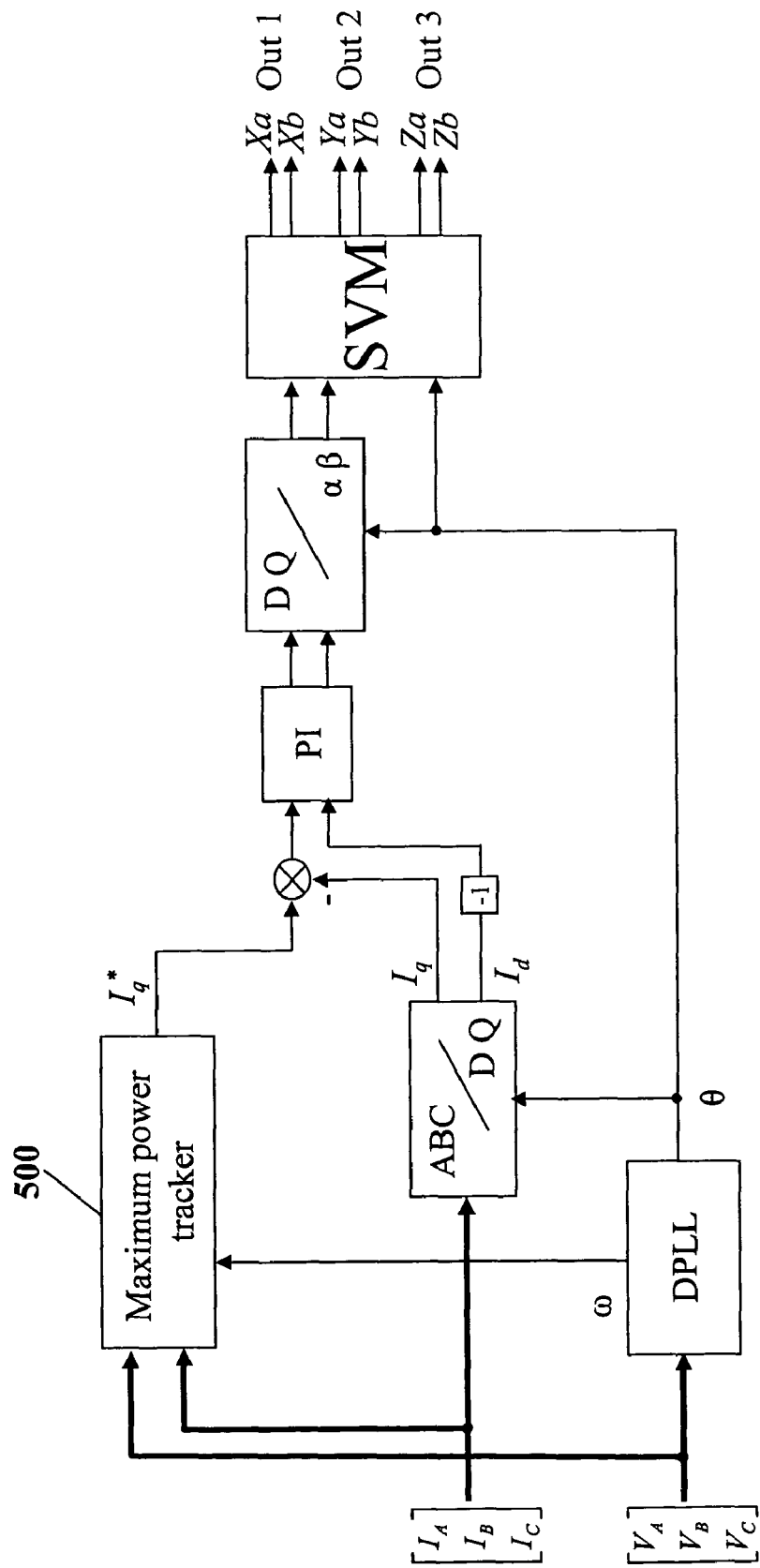
FIG. 5 shows a block diagram of an embodiment of the control structure used for a three-phase bridge.

Whilst the skilled person will appreciate that there are many techniques for controlling the current passing through a three-phase bridge, one of these techniques is depicted in FIG. 5 in which three phase voltages (V) and currents (I) assigned by the input selector 400 are used to generate a Space Vector Modulated (SVM) switching pattern. This is one exemplary method of how the six Pulse Width Modulated (PWM) output signals (X, Y and Z) are applied to the appropriate switching devices, via the output selector 402. The current control of FIG. 5 may be provided as a three-phase control module 720.

This current control technique uses D-Q axis theory where a fixed magnitude and fixed frequency voltage source with three sinusoidal time-varying voltages can be represented as two DC or constant values by using coordinates in a time-varying or rotating reference frame. The Q term is used to describe current in phase or 180 degrees out of phase with the voltage and the D term is used to describe current 90 degrees out of electrical phase to the voltage. Such D-Q axis theory will be well known to the skilled person who will appreciate that regulating the D axis current to zero ensures a unity power factor which maximises the real power (kW) per ampere delivered from a given source thereby helping to minimise the size of the source for the application in which it is to be used. The three phase voltage is applied to a Digital Phase-locked Loop (DPLL) which yields an estimate of phase θ. This is used by a combined Clarke-Park transformation to convert three phase current signals to D-Q equivalents $I_d$ and $I_q$. A Proportional and Integral gain is applied to minimise the error between $I_q$* the current demanded by 3Φ-power tracking module 500 and current feedback $I_q$, and regulate $I_d$ to zero (separate PI gains for D and Q terms). The 3Φ-power tracking module 500 controls the amount of current drawn from the source in order to track the maximum power output of a source. The phase θ is also used by an inverse Park transform to convert the PI controller output into α-β coordinates to calculate the SVM waveforms for the three complementary pairs of switching devices.

The controlled output is applied via the output selector 402 to the appropriate switching devices to maximise the power output of the source. A description of one of the many possible maximum power tracking methods is now given. In this particular embodiment the maximum power output of a source is sought without the operating characteristics of the source being pre-programmed into the controller 112 or otherwise known by the energy converter 100.

Whilst optimisation of a source to deliver maximum power may be applied to many different power sources (such as wind turbines, photo voltaic cells and the like) it is convenient, for the sake of ease of understanding, to make reference to one of these. For example, the power output of a wind turbine (i.e. a source) is related to the speed of rotation of the blades and for a given wind speed the output power may reduce or increase as speed of rotation changes. As such it is possible to monitor the power output from the source and vary the speed of rotation by changing the electrical loading of the source.

Figure 6:
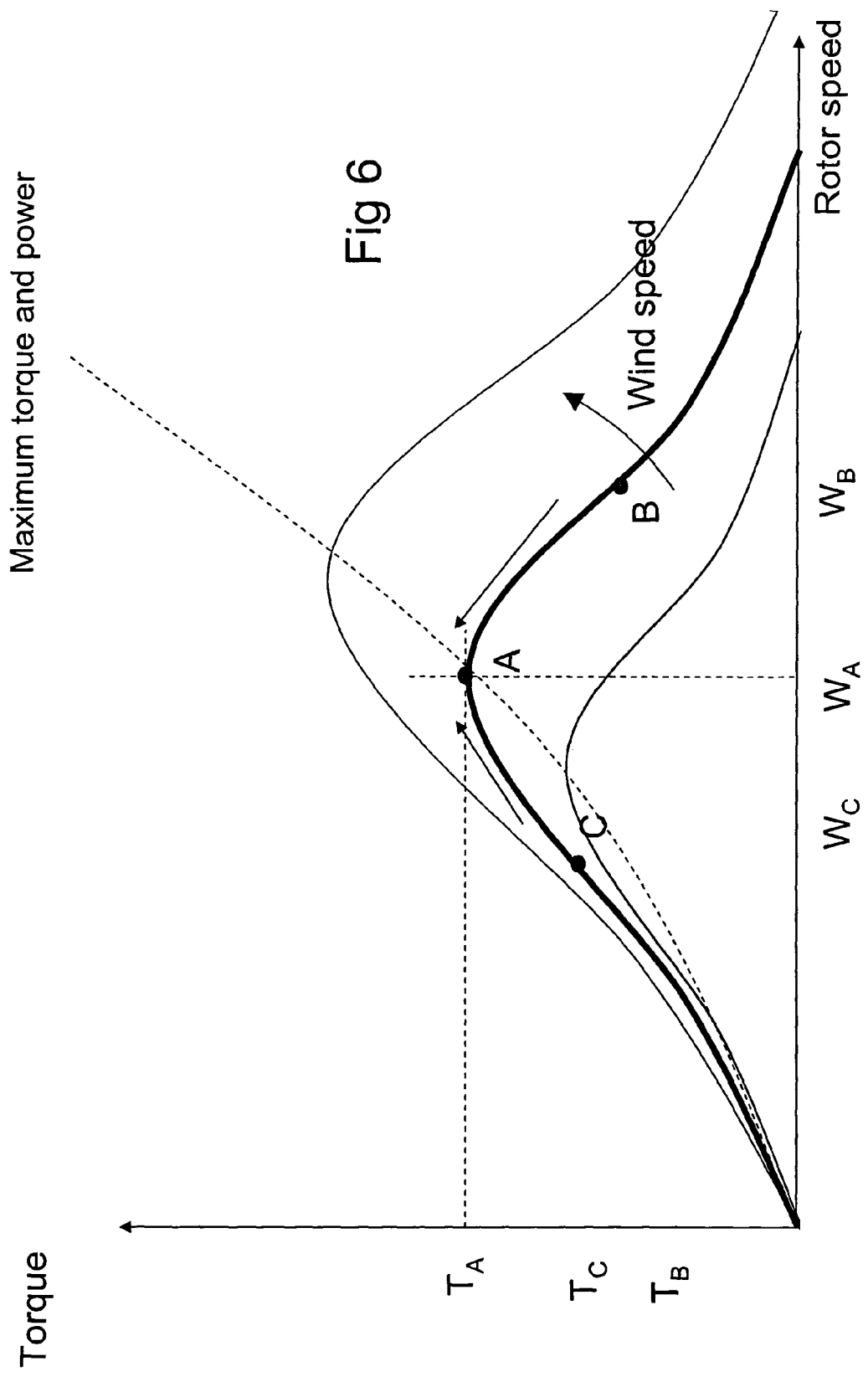
FIG. 6 shows typical torque-speed curves for a wind-turbine.

FIG. 6 illustrates a typical torque-speed characteristics of a wind turbine. The 3Φ-power tracking module 500 is arranged to calculate, from the outputs of the current 304 and voltage 306 sensors, the power generated by the generator driven by the wind turbine.

The turbine speed is controlled to track the speed at which maximum power occurs, as in the example in FIG. 6 at point A, by outputting a demanded electrical load on the generator. An important part of the 3Φ-power tracking module 500 is detecting which side of the torque characteristics the turbine is currently operating at, where each side of point A, the maximum power point, exhibit different characteristics, and gradually ramping the speed towards $W_A$.

As a first example, if the turbine is operating at point B with a speed $W_B$ and the 3Φ-power tracking module 500 has previously detected that it's above the maximum power point, a small but constant deceleration or ramping down of rotor speed (towards point A) will be demanded by the 3Φ-power tracking module 500, and an increased electrical loading will be applied to the turbine's generator to achieve this. As the available torque on the turbine increases the measured power will also increase, thereby confirming that the turbine is above the optimal speed. This will continue until roughly after point A when the operating behaviour changes to reflect the stall-side characteristics.

Below point A, the rotor will rapidly decelerate for further increases in load as the torque provided by the turbine drops off. The 3Φ-power tracking module 500 is arranged to detect this stall condition and stabilise turbine speed by control of the electrical loading. The tracking module 500 also detects stall by a reduction in measured electrical power as speed decreases.

When the turbine is operating on the stall side, such as point C, the operating characteristics differ to those above the maximum power point, in that speed control adopted above point A is inherently unstable. After the 3Φ-power tracking module 500 changes its control and actively stabilises rotor speed, it controls a small but constant acceleration of the rotor speed using current demand, until it increases beyond point A, the point of maximum power. Above point A the 3Φ-power tracking module 500 will detect a reduction in demanded current and therefore change back to a small but constant deceleration.

A similar control strategy can be used for other types of electrical energy sources. In a further example, the maximum power output from a solar voltaic cell is related to the current that it is output therefrom; the module implemented to achieve this is often referred to as a Maximum Power Point Tracker (MPPT). In this arrangement a 1Φ-power tracking module 550 may be employed. As such the 1Φ-power tracking module 550 is arranged to control the switching devices connected to a solar voltaic cell (i.e. a source) and perturbate the load to track maximum power point operation of the solar voltaic cell.

The power tracking modules 500, 550 can be thought of as being advantageous for at least two reasons. Firstly, it enables the energy converter 100 to interface to a wide range of sources, with non-identical but similar characteristics since it allows determination of an appropriate operating point. Secondly, the power tracking modules 500, 550 allow changes in conditions (for example, changes in solar intensity for solar photovoltaic arrays or wind strength in wind turbines and the like) to be accommodated.

Figure 7:
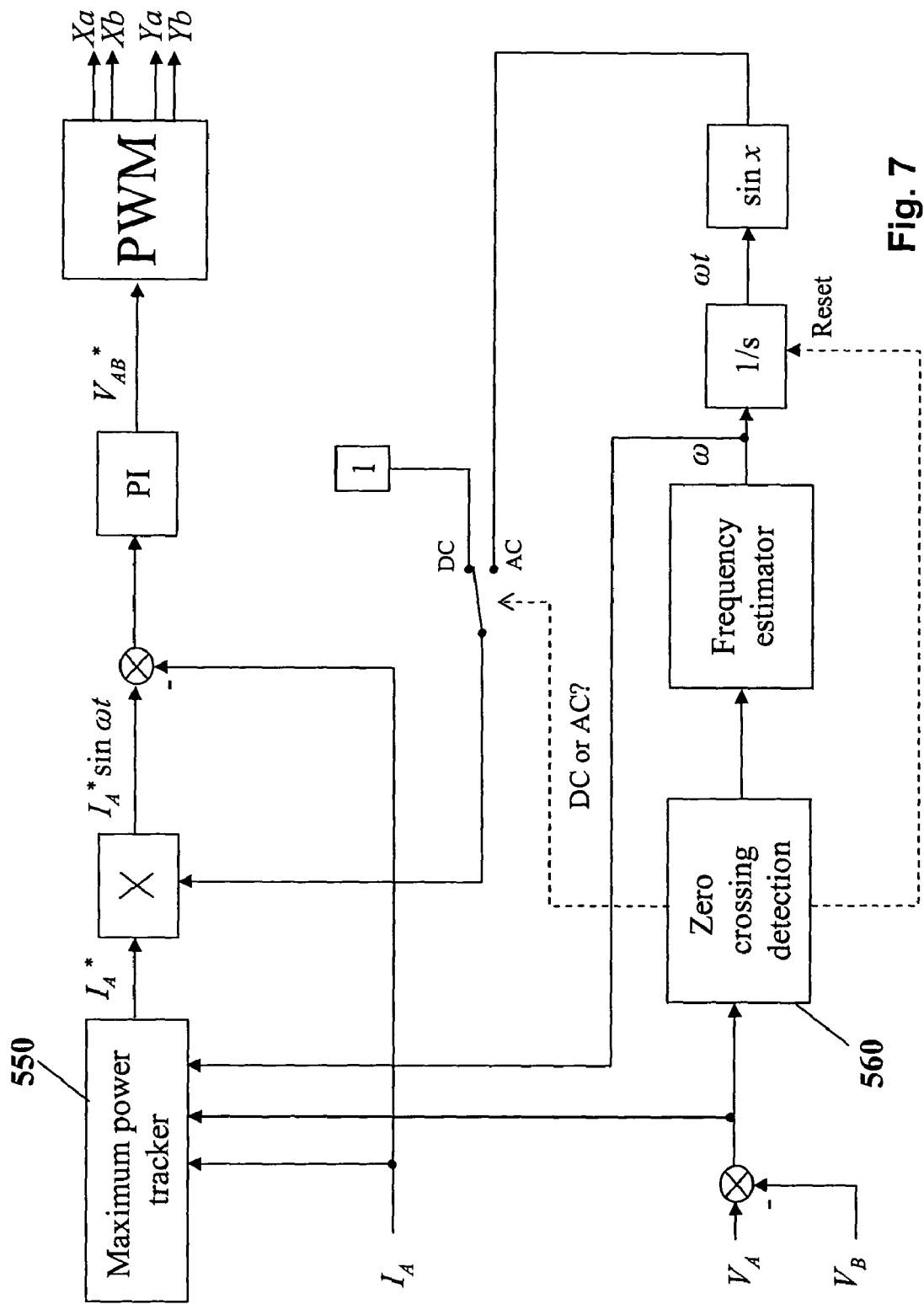
FIG. 7 shows a block diagram of an embodiment of the control structure used for a single-phase bridge (i.e. H-bridge)

In a similar manner to above, a skilled person will readily appreciate that there are many techniques for controlling the current passing through an H-bridge. One possible form of current control technique is shown in FIG. 7, where the two phase voltages ($V_A$ and $V_B$) and one current ($I_A$) are fed back from the relative voltage sensors 306 and the relative current sensor 302 respectively, depending upon the configuration of the input selector 400. The current control of FIG. 7 may be provided as a single-phase control module 730. The control module 730 is arranged to detect whether a H-bridge is connected to a DC or AC source. Although alternative methods are possible, in the present embodiment this is achieved by means of a zero-crossing detector 560.

If the H-bridge source voltage is AC, a current with unity power, i.e. the angle between the current and the voltage is zero, is achieved by multiplying the demanded current which is output by a 1Φ maximum power tracking module by the sine of the estimated phase of voltage waveform. If the H-bridge source voltage is DC, the current demand remains unchanged.

The error between the demanded current $I_A$*sin ωt for AC and $I_A$* for DC and the measured current $I_A$ is minimised by controlling the average H-bridge output voltage created by the PWM switching. In the present embodiment this is achieved by using a PI controller (standard proportional and integral gain control). A standard bipolar H-bridge PWM technique is used to achieve a desired output voltage. This is just one method of generating the PWM output signals and the general control approach is well understood by anyone trained in the art.

It will be readily appreciated that both the three-phase control module 720 and the single-phase control module 730 may be provided in a different manner than described above. For example there may be provided on the controller 112 multiple dedicated modules 720, 730 running for each configuration of the energy converter 100. Alternatively, there may be provided multiple processors 700, and memory 800, each with an input selector 400 and an output selector 402. The control modules 720, 730 may be provided in hardware, firmware, or software etc. Similarly components within the control modules 720, 730 may be provided in a separate module, such as providing a separate power tracking module 550, 550. A person skilled in the art, in a variety of different ways, will readily be able to obtain parametric data from the input terminals, P1 to P6, based upon the configuration of the input converter 104 and use a module to process this data to provide an output switching pattern based upon the configuration of the input converter 104. Similarly it will be readily appreciated that alternative control modules may be implemented, and the invention is not limited to the embodiments described here. For example, in an alternative embodiment, the current control modules 720, 730 may be provided with no maximum power tracking modules 500, 550, or may be based upon an alternative module as opposed to D-Q axis theory.

FIG. 8 shows the output generation stage 108. As is shown, the output generation stage 108 is arranged to connect the converter 100 to the output network 110. In the present embodiment the output network 110 is a typical three phase network. As such the DC link 106 is connected to two input terminals of a three-pole VSI having output terminals P7, P8 and P9 which in turn are each connected to a phase of the output network 110 via an LC filter 600, which comprising a output filter inductance 402. The output filter inductance 402 and a synchronising contactor 610 are both connected in series between the output terminals P7, P8, P9 and the output network 110. In the present embodiment the output generation stage 108 is arranged to convert DC power on the DC link 106 to three-phase AC power, although it is equally possible to convert the DC power to single phase AC, or DC.

Whilst the input conversion stage 104 has twelve switching devices, it will be readily appreciated that the output generation stage 108 shown in FIG. 8 has six. The output generation stage 108 can be considered as a standard grid-connected inverter VSI. Such VSI systems are well known, and it will be readily appreciated by a person skilled in the art how to implement such an output generation stage 108, which can be implemented using commercially available switching device packages (full bridge, half-bridge modules etc or the like).

Through synchronising with the output network 110 voltage in frequency, phase, rotation and amplitude, the output power will meet the standard set by the national distribution governing body and output network operator electrical supply standards.

Figure 9:
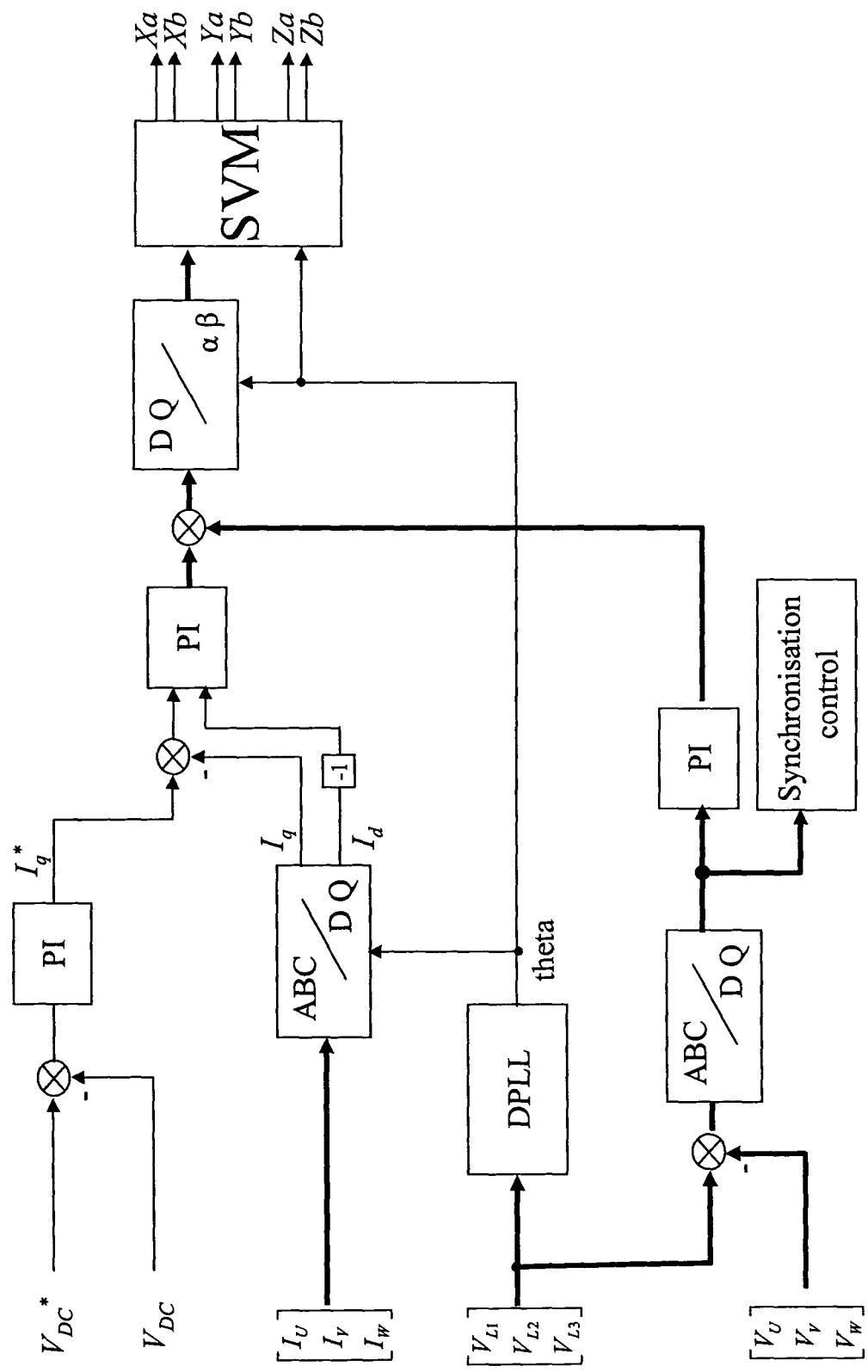
FIG. 9 shows a block diagram of an embodiment of the control structure used for an output generation stage of an electrical energy converter.

In a similar manner to that of the input terminals P1 to P6 in the input conversion stage 104, the current and voltage of each output terminal, P7, P8 and P9, are measured by output voltage sensors 620 and output current sensors 630 respectively. Network voltage sensors 640 measure the voltage of each line of the output network 110. The signals from all of these sensors are relayed to the controller 112. FIG. 9 shows a output control module 1000 used by the controller 112 to control the output generation stage 108

The controller 112 outputs a three phase SVM PWM waveform to the three pairs of switching devices to synthesise a three phase voltage on a LC filter 600. The amplitude and phase of this voltage is controlled to meet two objectives. The first is to synchronising the energy converter 100 to the output network 110, where $V_{P7}$ to $V_{P9}$ match $V_U$ to $V_W$ in phase, amplitude, frequency and rotation. A PI controller minimises the error between the two sets of voltages, which is converted to DQ co-ordinates, by control of the SVM PWM.

The second objective is control of the AC current $I_{P7}$ to $I_{P9}$, after synchronisation has occurred. The filter voltage $V_U$ to $V_W$ is applied to a DPLL to estimate the phase θ of the network voltage, which is used to represent the three phase current in D-Q terms. A PI controller regulates $I_d$ to zero to enable a unity power factor and controls $I_q$ to track a demanded $I_q$* output by a PI controller on the DC link voltage error. The DC link control maintains the DC link voltage $V_{DC}$ at a desired level $V_{DC}$*.

It will be readily appreciated to a person in the art that the output PWM voltage waveform is derived from the measured filter current and both output network 110 voltage and filter voltage. The controller 112 is further arranged to control the synchronisation of the output generation stage 108 with the output network 110 by means of the synchronisation contactor 610. FIG. 10 shows a technique used by the controller 112 to control the output generation stage 108.

In the present embodiment the controller 112 is arranged therefore, amongst other things, to; 1.) synchronise the output generation stage 108 voltage with the output network 110 voltage and 2.) output a unity or near unity power factor current, with the magnitude controlled in order to regulate the DC link 106 voltage at the output of the input conversion stage 104. The DC link 106 voltage is regulated by transferring DC link energy to or from the output network 110. As energy is transferred from the energy source(s) to the DC link 106, via the input conversion stage 104, the DC link 106 voltage increases. The output generation stage 108 then transfers comparable energy to the output network 110, thereby maintaining an energy balance in the converter 100. This may be considered as a control response. Control of such an output generation stage 108 is well known and is detailed further elsewhere.

It will be readily appreciated that both the input conversion stage 104 and output generation stage 108 allow a bi-directional flow of power. Therefore it is possible to draw power from the output network 110 to supply a source attached to the converter 100 and or circulate power between two alternative sources via the input conversion stage 104.

Such an embodiment as described herein may be advantageous and have the ability to reconfigure automatically, without human intervention, to the characteristics of the electrical energy source(s). Reconfiguring the control of the six inverter poles in the input conversion stage 104, allows them to operate independently, or paralleled in a pair or group of three, forming a combination of H-bridge(s) and/or three-phase bridge(s). Whilst multiple input configurations are possible, five configurations are herein by means of an example.

The configuration described above and the connections are merely representative of the flexibility offered by an electrical energy converter 100 with a six-pole VSI as input conversion stage 104, and implementing an automatic configuration method. This approach can be expanded to include other configurations where a method detects the external circuit, and assigns the structure and form of controller 112, whether it's for a H-bridge or three-phase bridge, or combination thereof.

It will also be readily appreciated that the present invention is not limited to the use of a six-pole VSI as an input conversion stage 104, and further embodiments may comprise any number of poles suited to both three phase and single-phase configurations. A person skilled in the art will readily appreciate how to implement such a system accordingly.

The invention claimed is:

1. An electrical energy converter arranged to be connected to at least one source of electrical energy and to condition the energy generated by that source for feeding to an electrical network to which the converter is connected, the converter comprising an input conversion stage having at least six input terminals arranged in two banks of three input terminals and a controller, the controller being arranged to configure each of the terminals to accept any one of the following input types:
   a phase of a polyphase supply;
   one side of a single phase supply;
   one side of a DC supply; and
   no-input;
wherein the controller is further arranged so that each terminal to which a source of electrical energy is connected transfers power from any one of the following input types:
   a three phase supply;
   two three phase supplies;
   a single phase or DC supply; and
   three independent single or DC supplies;
wherein the converter is arranged such that at least one input type is connected across the two banks of input terminals.

2. A converter according to claim 1 in which the input conversion stage comprises six pairs of switching devices, each pair of switching devices comprising an upper-switching device and a lower-switching device.

3. A converter according to claim 2 in which an input terminal to the converter is connected to a junction between one of the pairs of switching devices.

4. A converter according to claim 2 which is arranged such that at least one of the upper-switching devices and the lower switching device of each pair are switched substantially in unison.

5. A converter according to claim 2 which is arranged to apply a SVM (Space Vector Modulated) switching pattern to each pair of switching devices.

6. A converter according to claim 2 which is configurable to operate the switching devices wherein a single phase supply or a DC input is applied to one of the input terminals of a pair of switching devices in one of the banks.

7. A converter according to claim 2 which is arranged to allow a three phase supply to be applied to the input terminal of a pair of switching devices in one of the banks.

8. A converter according to claim 2 which is arranged to allow a three phase supply to be connected to the input conversion stage, wherein each phase of the three phase supply is applied to two of the pairs of switching devices.

9. A converter according to claim 2 wherein the controller is arranged to monitor the input terminals and further arranged to configure the operation of the switching devices according to the or each input to the input conversion stage.

10. A converter according to claim 2 in which the controller is arranged to calculate the power factor of an input to the converter and to control the switching devices such that that input has substantially a unity power factor.

11. A converter according to claim 1 which comprises at least one sensor associated with each input terminal.

12. A converter according to claim 11 which comprises a current and a voltage sensor associated with each input terminal.

13. A converter according to claim 12 wherein the controller is arranged to monitor at least one of the current and voltage sensors and to configure the operation of switching devices connected to the input terminals according to the reading from the monitored sensor.

14. A converter according to claim 1 wherein the input conversion stage is arranged to process electrical energy input to the converter and to pass that energy across a DC link.

15. A converter according to claim 14 which is arranged such that energy passed across the DC link is passed to an output generation stage.

16. A converter according to claim 15 wherein the output generation stage comprises three sets of switching devices each of which is controlled by a controller.

17. A converter according to claim 1 which comprises a power tracking module arranged to determine the power being output by a source connected to the converter and arranged to cause the controller to control the input conversion stage to adjust the electrical load placed upon a source connected to the converter.

18. A converter according to claim 17 in which the power tracking module is arranged to cause the controller to adjust the load applied to a source in order to optimize the power output of the source.

19. A machine readable data carrier containing instructions which when read onto a machine cause that machine to perform as the converter of claim 1.

20. A method of converting electrical energy generated by source thereof to a form suitable for being connected to a network comprising controlling an input conversion stage of a controller according to the input type of the electrical energy wherein the input type may be any one of the following: a phase of a polyphase supply; a single phase supply; a DC supply; and no input.

* * * * *